United States Patent
Holenstein et al.

(10) Patent No.: US 12,095,407 B1
(45) Date of Patent: Sep. 17, 2024

(54) APPARATUS FOR MODIFYING A CRANKSHAFT ANGLE OF A CRANKSHAFT IN AN INTERNAL COMBUSTION ENGINE TO PROVIDE A VIRTUAL FLYWHEEL OPERATION

(71) Applicant: Gravic, Inc., Malvern, PA (US)

(72) Inventors: Bruce D. Holenstein, Media, PA (US); Dylan R. Holenstein, Newtown Square, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

(21) Appl. No.: 18/627,276

(22) Filed: Apr. 4, 2024

(51) Int. Cl.
| | |
|---|---|
| *H02P 9/08* | (2006.01) |
| *F02B 63/04* | (2006.01) |
| *F02D 29/06* | (2006.01) |
| *F02D 41/00* | (2006.01) |
| *H02P 101/25* | (2016.01) |
| *H02P 101/40* | (2015.01) |

(52) U.S. Cl.
CPC ............ *H02P 9/08* (2013.01); *F02B 63/042* (2013.01); *F02D 29/06* (2013.01); *F02D 41/009* (2013.01); *H02P 2101/25* (2015.01); *H02P 2101/40* (2015.01)

(58) Field of Classification Search
CPC .... H02P 9/08; H02P 2101/25; H02P 2101/40; F02B 63/042; F02D 29/06; F02D 41/009
USPC .......................................................... 290/31
See application file for complete search history.

(56) References Cited

U.S. PATENT DOCUMENTS

| | | | | |
|---|---|---|---|---|
| 4,413,508 A | * | 11/1983 | Kawamura | ........... F02D 41/009 73/114.26 |
| 5,575,258 A | * | 11/1996 | Iochi | ..................... F02D 41/009 123/406.62 |
| 6,035,826 A | * | 3/2000 | Matsuoka | ............... F02P 7/067 123/406.62 |
| 6,167,755 B1 | | 1/2001 | Damson et al. | |
| 7,174,879 B1 | * | 2/2007 | Chol | ................... F02D 41/1497 123/434 |
| 7,467,041 B2 | | 12/2008 | Okubo et al. | |
| 7,722,498 B2 | | 5/2010 | Kawasaki et al. | |

(Continued)

FOREIGN PATENT DOCUMENTS

| | | | | |
|---|---|---|---|---|
| CN | 101385233 B | * | 2/2012 | ............ H02P 25/034 |
| EP | 4119374 A1 | | 1/2023 | |
| WO | 2022/175409 A1 | | 8/2022 | |

*Primary Examiner* — Charles Reid, Jr.
(74) *Attorney, Agent, or Firm* — Clark A. Jablon

(57) ABSTRACT

An apparatus is provided for modifying a crankshaft angle of an internal combustion engine (ICE). An energy converter is configured to be connected to a crankshaft of the ICE. An energy storage unit is configured to deliver energy to the energy converter when the energy converter acts as a motor, and to store energy output from the energy converter when the energy converter acts as a generator. The controller is configured to calculate a current ideal crankshaft angle, calculate a current slip angle using an output of a crankshaft angle sensor, activate the energy converter as a motor to increase the current crankshaft angle when the current slip angle is greater than a predetermined upper threshold value, and activate the energy converter as a generator to decrease the current crankshaft angle when the current slip angle is less than a predetermined lower threshold value.

28 Claims, 7 Drawing Sheets

Controller Operation

(56) References Cited

U.S. PATENT DOCUMENTS

| | | | |
|---|---|---|---|
| 7,765,980 B2* | 8/2010 | Vogel | F02B 23/105 123/305 |
| 2003/0168044 A1* | 9/2003 | Rupp | G01M 15/06 73/114.26 |
| 2008/0245142 A1* | 10/2008 | Bowling | F02D 41/009 73/114.26 |
| 2014/0149019 A1* | 5/2014 | Martin | F02D 41/009 701/103 |
| 2021/0123389 A1* | 4/2021 | Salvi | F02D 41/009 |

* cited by examiner

APPARATUS FOR MODIFYING A CRANKSHAFT ANGLE OF A CRANKSHAFT IN AN INTERNAL COMBUSTION ENGINE TO PROVIDE A VIRTUAL FLYWHEEL OPERATION

BACKGROUND OF THE INVENTION

1. Overview Background

Machines with rotating components produce vibrations and other undesirable transient forces that can prematurely wear out parts, permanently damage the machine, load, or bother the users of the machine. A common type of machine with rotating components uses an electric motor or fossil fuel engine to power the working parts of the machine. For example, many automobiles use a gasoline engine to power a transmission which turns the wheels. The pistons in the engine push against the crankshaft of the engine and produce a varying torque which can cause harmonic vibrations that are destructive to the vehicle components and annoying to the passengers. One critical component of many machines is a flywheel assembly that is often attached near the main source of the vibrations. In the case of an automobile, the flywheel is usually attached directly to the crankshaft.

2. Flywheel

Flywheels are usually discs of steel or another strong substance which use their rotational motion about an axis to store energy and angular momentum. If the speed of a shaft to which a flywheel is attached is changed, conservation of angular momentum causes energy in the flywheel to be used to resist the slowing, or energy to be absorbed to resist the speedup. Thus, flywheels serve as a form of mechanical low-pass filter for mechanical vibrations. In other words, they smooth out the rotational speed of a shaft which runs through their rotational axis, thus reducing harmful vibrations.

The angular momentum of a flywheel is directly proportionate to the mass times the square of the size of the flywheel (i.e., parameters used to calculate its moment of inertia) times its rotational speed. Often, flywheels often wind up being large and heavy objects. When a machine operator wishes to increase or decrease the rotational speed of the machine, the moment of inertia of the flywheel resists the change and thus causes latency in reaching the desired speed.

The mass and latency inherent with flywheels are often not a problem with static machinery affixed to a factory floor, but can be a problem for objects that move, such as automobiles. Street cars, for example, may have flywheels that weigh as much as 1% or more of the vehicle's curb weight. Race cars, in contrast, may use lightweight flywheels in their engines to improve the responsiveness of their engines to changes in throttle inputs. However, these flywheels still may weigh as much as 0.5% of the curb weight of the vehicle. The mass and latency inherent in the flywheel will slow down the responsiveness of the engine of the vehicle, waste fuel, and may cost a race car driver a podium finish.

3. Motor Generator Unit (MGU)

Many electric vehicles (EVs) contain a motor generator unit (MGU). When operating as a motor, the MGU uses stored electrical energy to run the motor to power the wheels. When the EV is descending a hill, or the driver is otherwise using the brake to slow the vehicle, the MGU is operated as a generator to return energy to the battery. This is a form of regenerative braking. Hybrid motor-engine vehicles use a regular internal combustion engine (ICE) in combination with a MGU to improve fuel economy and acceleration. The MGU is attached to the ICE crankshaft either directly or via a transmission that is able to optimize power transfer.

The MGU may also serve as an Integrated Starter Generator (ISG). The motor in the MGU may be used to start the ICE, and the generator may be used at times to power the vehicle's electrical components in addition to charging the battery.

4. What is Needed

Vehicles and other machinery which contain machinery with components that rotate due to the action of an ICE need systems and methods that can smooth out engine operation, suppress vibrations, and reduce undesirable forces from the rotational components. This is commonly done using flywheels. Alternate solutions are needed to replace or diminish the use of flywheels which are heavy and resist desired engine speed changes.

The present invention provides preferred embodiments which help to meet these needs.

SUMMARY OF THE PRESENT INVENTION

Apparatus and computer program products are provided for modifying a crankshaft angle of an ICE.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. OVERVIEW OF INVENTIVE CONCEPT

Most internal combustion engines (ICE) have four stages: Fuel/air Intake, Compression, Power, and Exhaust. Most modern vehicle ICE have these stages, called strokes or cycles, spread out over two full rotations of the crankshaft to form a traditional 4-cycle (four stroke) engine. The inventive concepts herein also apply to multi-piston, diesel, two-stroke/cycle, Wankel, turbine, and other engine designs, some of which may use compressed air, electromagnets or other methods to power the engine. Additionally, some alternate engine designs do not have crankshafts, however, the inventive concepts herein described apply to them. The term "crankshaft" thereby may be substituted by the term shaft, main shaft, takeoff shaft, or other term that describes the primary shaft, or a shaft attached by gearing or a transmission to the main shaft, that rotates due to the action of the engine power.

Figure 1:
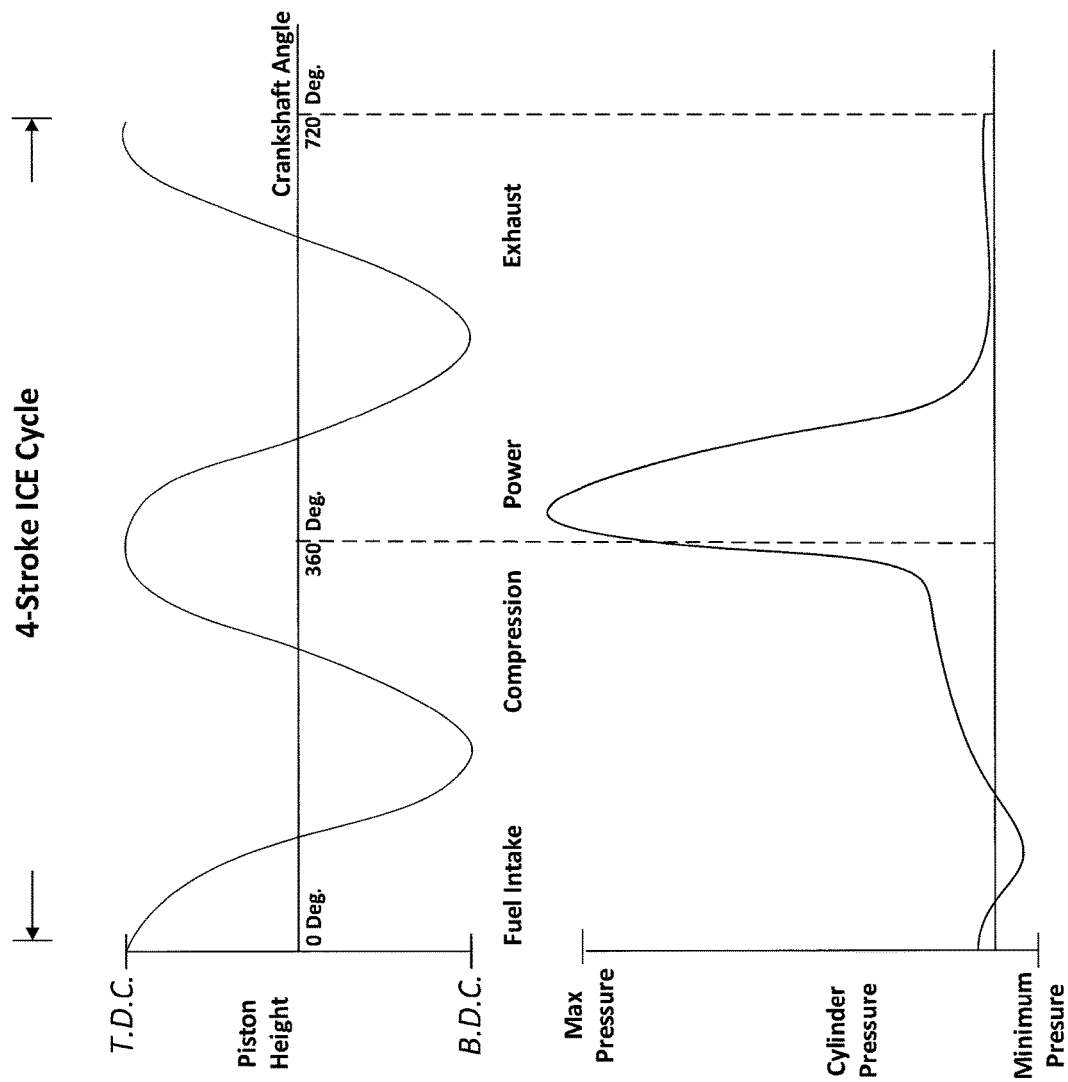
FIG. 1 is a prior art depiction of piston height and the cylinder pressure as a function of crankshaft angle in an ICE.

FIG. 1 illustrates the piston height and cylinder pressure of an exemplary internal combustion engine with a single piston and the 4-cycles. The 4-cycles consists of the following components spaced approximately evenly over the two full crankshaft rotation of the four strokes, i.e., 720 degrees:

1. Intake (Approximately 0 to about 180 degrees). The intake valve(s) open (IVO) at or around Top Dead Center (TDC) of the piston. The piston descends towards Bottom Dead Center (BDC) and a fuel/air mixture is sucked into the cylinder from the manifold. This may cause the manifold to experience a negative pressure, often around-1.0 PSI in an automobile engine at idle.
2. Compression (Approximately 180 to 360 degrees). The intake valve(s) close (IVC) at or around BDC and the piston ascends towards TDC again. At around TDC the pressure in the cylinder is around 10 bar (10:1 compression ratio). Ignition (often by a spark) occurs at, or near (usually before), TDC and the pressure in the cylinder rises rapidly to the maximum pressure.
3. Power (Approximately 360 to 540 degrees). The increased pressure from ignition applies work to the piston as it descends from TDC to BDC. The work causes the crankshaft to rotate and turn the traditional flywheel (if present) and transmission components. The crankshaft actually acts like a torsion bar spring as it is twisted under load. Depending on the type of engine, the peak pressure may be 40 bar to 100 bar or even higher as the fuel/air mixture is burned.
4. Exhaust (Approximately 540 to 720 degrees). At about, or usually before, BDC after the Power stroke, the exhaust valve opens (EVO) and the exhaust in the cylinder quickly evacuates the cylinder as the cylinder rises. The exhaust valve closes near TDC, and the cycle repeats.

As is apparent, energy is needed to move the crankshaft through the Intake, Compression, and Exhaust strokes. The Power stroke produces enough energy to satisfy those needs and to pass excess power onto the load (i.e., the transmission and wheels in the case of a vehicle). The massive pressure changes in the cylinder causes forces on the piston to vary by orders of magnitude over milliseconds as seen in the lower plot of FIG. 1. A 4-cycle engine at idle may be running at 600 RPM or 10 rotations per second. So, each stroke at idle takes about 50 milliseconds to complete, or just 5 milliseconds to complete at 6000 RPM. An 8-cylinder, 4-cycle engine at idle fires a piston around every 25 milliseconds.

1. Virtual Flywheel

As explained in the Background section, the main functions of a traditional flywheel are to use conservation of angular momentum to convert energy stored in the flywheel to resist crankshaft slowing and speedup caused by the uneven and rapid forces produced by the torsion in the crankshaft from the pistons. Due to the extremely large and varying forces (e.g., 7 k lbs at peak pressure for a 4-inch diameter cylinder), the crankshaft acts as a torsion spring and twists up to a degree or more back and forth under load. Undamped harmonic vibrations may build along the crankshaft and may damage the crankshaft, piston cylinders, rods, gearing, transmission or other engine components.

Only lower frequency mechanical motions of the crankshaft are desired to be passed onto the transmission and other vehicle components. Traditional flywheels add unwanted weight to the vehicle, and delay or otherwise inhibit an engine from quickly speeding up or slowing down.

Figure 2:
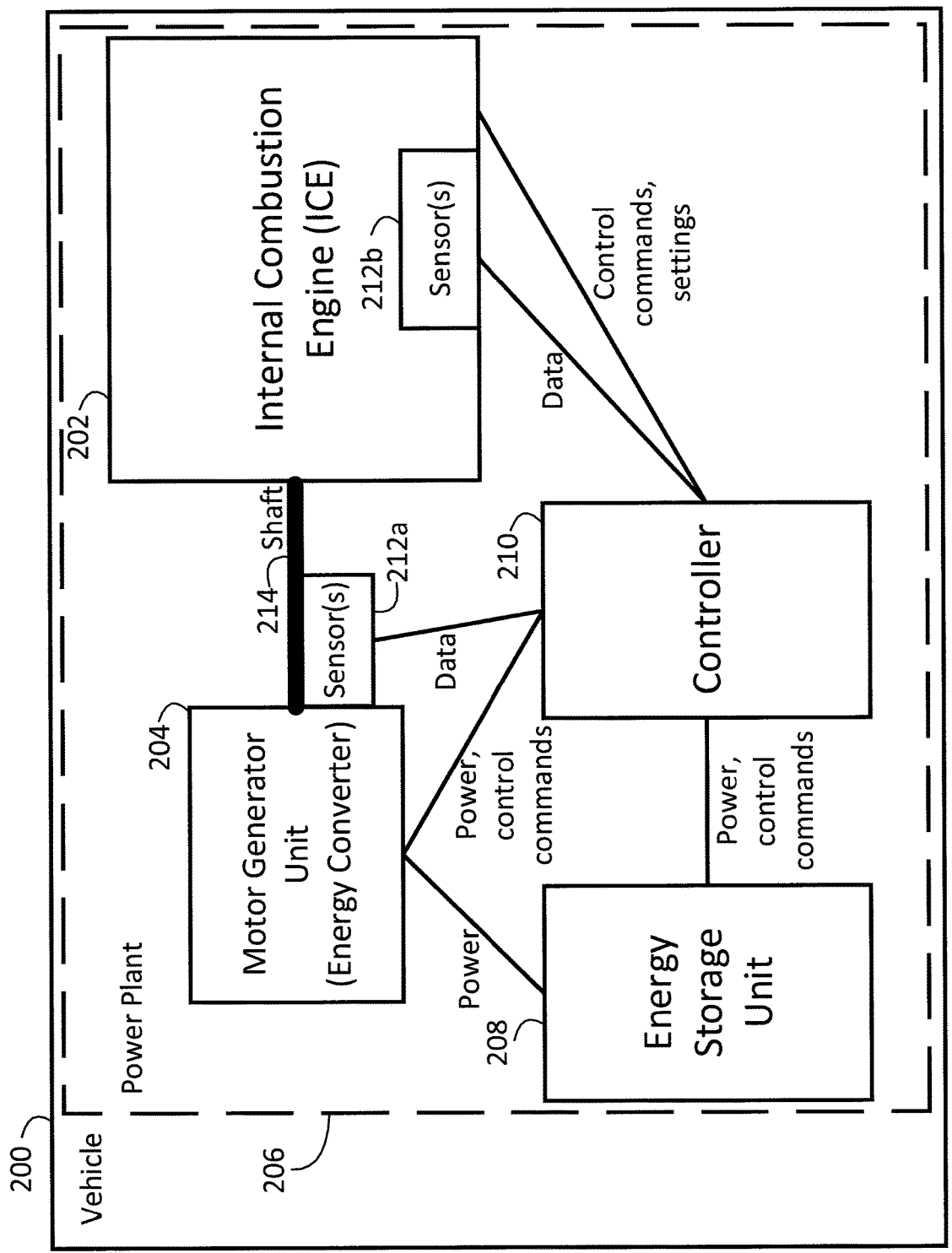
FIG. 2 is a schematic diagram of system components in accordance with one preferred embodiment of the present invention.

An object of a preferred embodiment of the present invention is to provide a form of virtual flywheel to emulate the desired mechanical vibration filtering of the flywheel and yet be lightweight and not add significant latency to an engine that is purposefully being spun up or slowed down. This will eliminate or greatly diminish the traditional flywheel size which normally needs to be attached to the ICE. The main components of one preferred embodiment are illustrated in FIG. 2, where (200) is the vehicle, and the vehicle has the following Power Plant (206) components:

1. ICE engine (202) tied by shaft (214) to Motor Generator Unit (MGU) (204), although other energy converters such as a lone generator or motor unit may be used instead of the MGU (204) as described later.
2. Sensor(s) (212a, 212b) in or connected to the ICE engine, shaft (214), or other components of (206). The sensors may be used to measure temperature, energy use, pressures, engine speed, currents, or other parameters. A primary sensor may be used to measure the shaft (214) angle to know where the engine is in its cycle. The primary sensor is also interchangeably referred to herein as a "crankshaft angle sensor."
3. Energy storage unit (208) having one or more batteries, super capacitors, or other power storage and delivery devices. Its primary connection is to the Motor Generator Unit (204) although it and the other components of (206) may optionally get signals from a controller, described below.
4. Controller (210) utilize the sensor (212a, 212b) inputs, optionally calculates predictions/phase differences, and then controls the energy converter (204) such as a MGU. The MGU is interchangeably referred to herein as "MGU (204)" when it functions as the energy converter (204)." Depending on the controller (210) design, the controller (210) may provide commands to the energy storage unit (208) or the energy converter (204), or may transfer/switch power between the energy storage unit (208) and the energy converter (204). Embodiments may operate with the other components to produce an automatic open loop feedforward or closed loop feedback system.

2. Operation of the Controller

The operation of the controller (210) is critical to the attainment of a successful virtual flywheel in action. The controller (210) utilizes programmed logic to calculate a current ideal crankshaft angle, usually as a linear function of time, though other mathematical and parametric functions may be used. Often the current ideal crankshaft angle may be expected to increase linearly with time, however, that may not be the case in some scenarios, for example, where there are large differentials in power or loads.

There are two primary modes that the controller (210) may work, as follows. Variations or combinations of the possible modes are also anticipated.

A. Controller Position Prediction Operation. This mode of operation forms an automatic open loop feedforward control system. The controller (210) uses programmed logic to calculate into the future (i.e., predict) a current slip angle from the current ideal crankshaft angle. The calculated current slip angle may be positive (i.e., crankshaft angle trailing) or negative (i.e., crankshaft angle advanced). The programmed logic may, for example, make use of detailed knowledge of the mechanical workings of the vehicle (200) or its various components, and/or it may use past knowledge of how the slip angle varies as a function of time and crankshaft angle. The controller (210) makes use of the sensor (212a, 212b) output to indicate when to start (or reset) counting time (e.g., T=0 is at TDC right before Fuel Intake).

B. Controller Phase-Locked Operation. This mode of operation forms an automatic closed loop feedback control system. The controller (210) compares the shaft (214) angle sensor (212a) output (i.e., current crankshaft angle) to the current ideal crankshaft angle calculated by the controller (210) that would produce minimal, or at least tolerable, vibration and jerkiness of the engine, and at the engine output (as measured by accelerometer sensors and vibration sensors, among other sensing devices).

If the phase difference (i.e., current slip angle) is negative, or likely to soon be negative, based on current and past conditions, then the current actual crankshaft position is ahead (or soon will be ahead) of the ideal crankshaft angle. If so, the energy converter (204) may be put into a generator mode to consume engine (rotational) power and deliver it to the energy storage unit (208) (or optionally waste it via resistive heating or use it in another energy sink). If, however, the phase difference (i.e., current slip angle) is positive, or likely to soon be positive, based on current and past conditions, then the opposite condition is present and the energy converter (204) is utilized in a motor mode to advance the current crankshaft angle. The magnitude of the phase difference might be used as an input to moderate the generator load or motor power. In other words, the motor power or generator load applied to the shaft (214) may be a function of the magnitude, for example, directly proportionate, or another mathematical function or group of functions or logic. The controller (210) may utilize threshold values to determine whether or not to activate, or how much to activate, the energy converter (204). Different threshold values may be utilized for different magnitudes, signs (positive or negative), or rates of change of the current slip angle. The current vehicle operating mode may also be used to alter the thresholds to optimize desired performance characteristics.

At predetermined intervals of time or crankshaft angle, or via sensor inputs or interrupts, or other mechanisms or events such as a stall or over-RPM condition, the controller (210) will repeat its controller operations. If needed, the controller (210) may be configured to disable, enable, or alter the usage of, the energy converter (204) (e.g., MGU) when vibration, or another sensed parameter, is outside a predetermined threshold range. For example, the controller (210) may disable (or alter the usage of) the energy converter (204) when vibration is minimized because the ICE is running at a high RPM. As another example, if a sensor reports that the vehicle operator desires to accelerate quickly, the energy converter (204) may be run at a high rate of power input into the crankshaft (e.g., operating as a motor at maximum power) despite current crankshaft angle. Likewise, if the operator is seeking to brake quickly, the energy converter may be put into 100% generator mode regardless of the current crankshaft angle.

A further refinement of the preferred embodiment uses the energy converter (204) for purposes such as:
1. Making vehicle stop/starts in traffic smoother,
2. Totally avoiding ICE starts for some short driving segments,
3. Removing the need for the ICE starter motor and alternator,
4. Allowing the ICE to smoothly operate with only one (or a subset) of the pistons firing, or even only firing sporadically when load is extremely low such as descending a hill.

Figure 3:
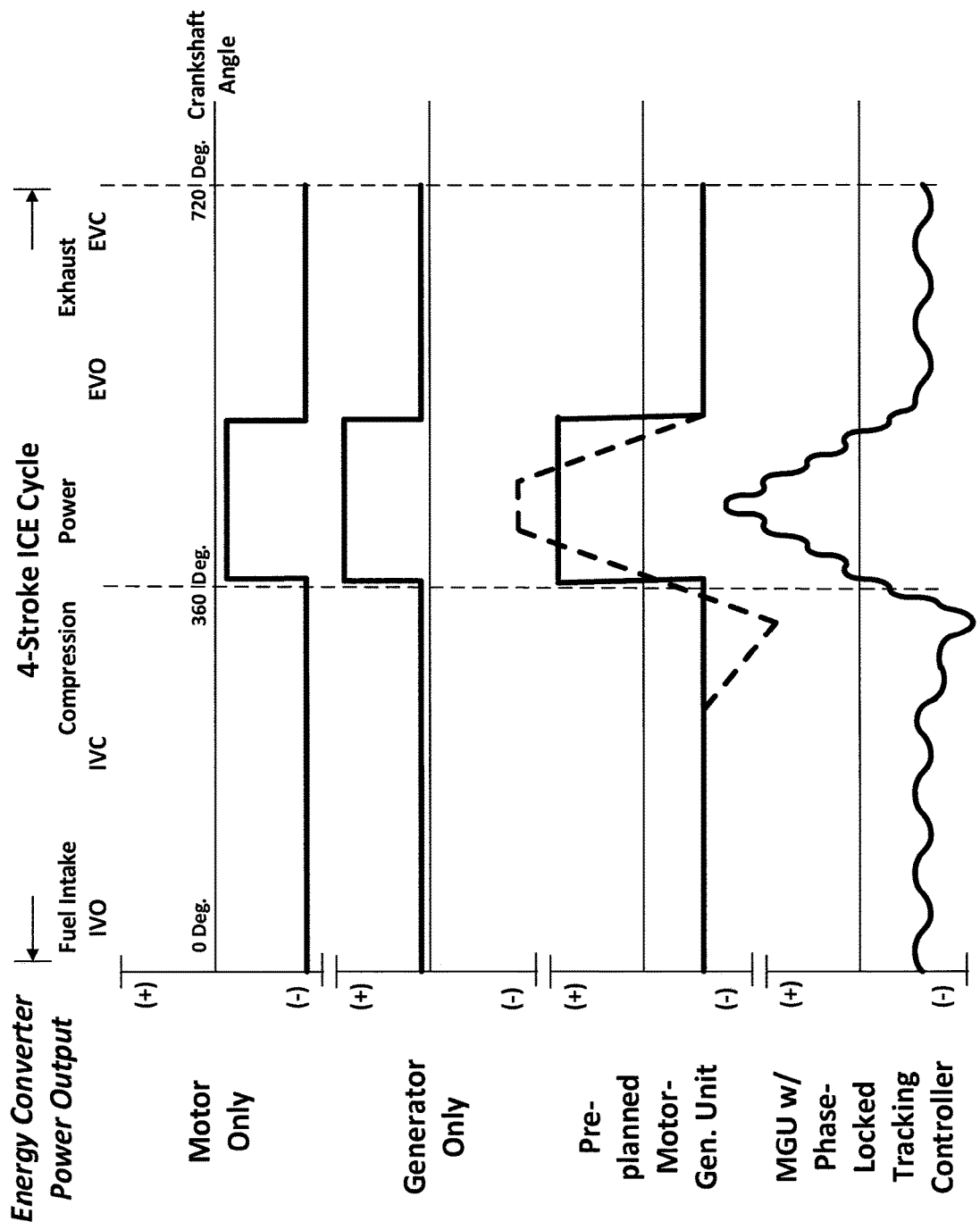
FIG. 3 depicts energy converter power output (when positive) and input (when negative) as a function of crankshaft angle in an ICE for four preferred embodiments of the present invention.

As discussed above, one preferred implementation of the energy converter (204) is the MGU, however, the energy converter (204) may alternatively include a lone generator or motor capability. The output of the generator, or power input to the motor, may be actively varied by the controller (210) to provide the virtual flywheel action. FIG. 3 illustrates various modes of operation of the energy converter (204):

1. The top plot is for an energy converter (204) that has a motor only. The controller (210) is running in a Position Prediction Operation mode that states that the motor should run at a moderate power input from the energy storage unit (208) for the Fuel intake, Compression, and Exhaust strokes, and turn off or reduce power for the Power stroke.
2. The second plot is for an energy converter (204) that has a generator only. The controller (210) is running in a Position Prediction Operation mode that states that for all strokes except for the Power stroke the generator is turned off.
3. The third plot is for an energy converter (204) that has a MGU. The controller (210) is running in a Position Prediction Operation mode that states that the MGU runs as a motor for all of the strokes except for the Power stroke where the MGU runs as a generator. The MGU may not need to run at full power/load (+/−) and the controller (210) may ramp up/down the generator load or motor power levels, even beyond 100% for a short period of time, as shown by the dashed lines on the plot.
4. The bottom plot shows an energy converter (204) which has a MGU where the controller (210) is operating in a Phase-Locked Operation mode. The controller (210) calculates where the shaft (214) should be at a preferred rate of rotation (e.g., with minimal vibrations (as measured by vibration sensors), or risk of producing damaging harmonics). The shaft (214) sensor (212a) provides the actual current crankshaft angle, and the difference is used by the controller (210) which, at predetermined intervals of time (time intervals) or angle intervals (based on the current crankshaft angle), or other intervals or triggers, makes corrections to the actual current crankshaft angle by operating the motor or generator (or MGU) to correct for the phase difference. This may result in the oscillations of the MGU shown in the plot. Closed loop control system methods to control oscillations may be utilized to minimize controller (210), sensor, and mechanical latency-caused oscillations.

3. Controller Operation Details

Figure 4:
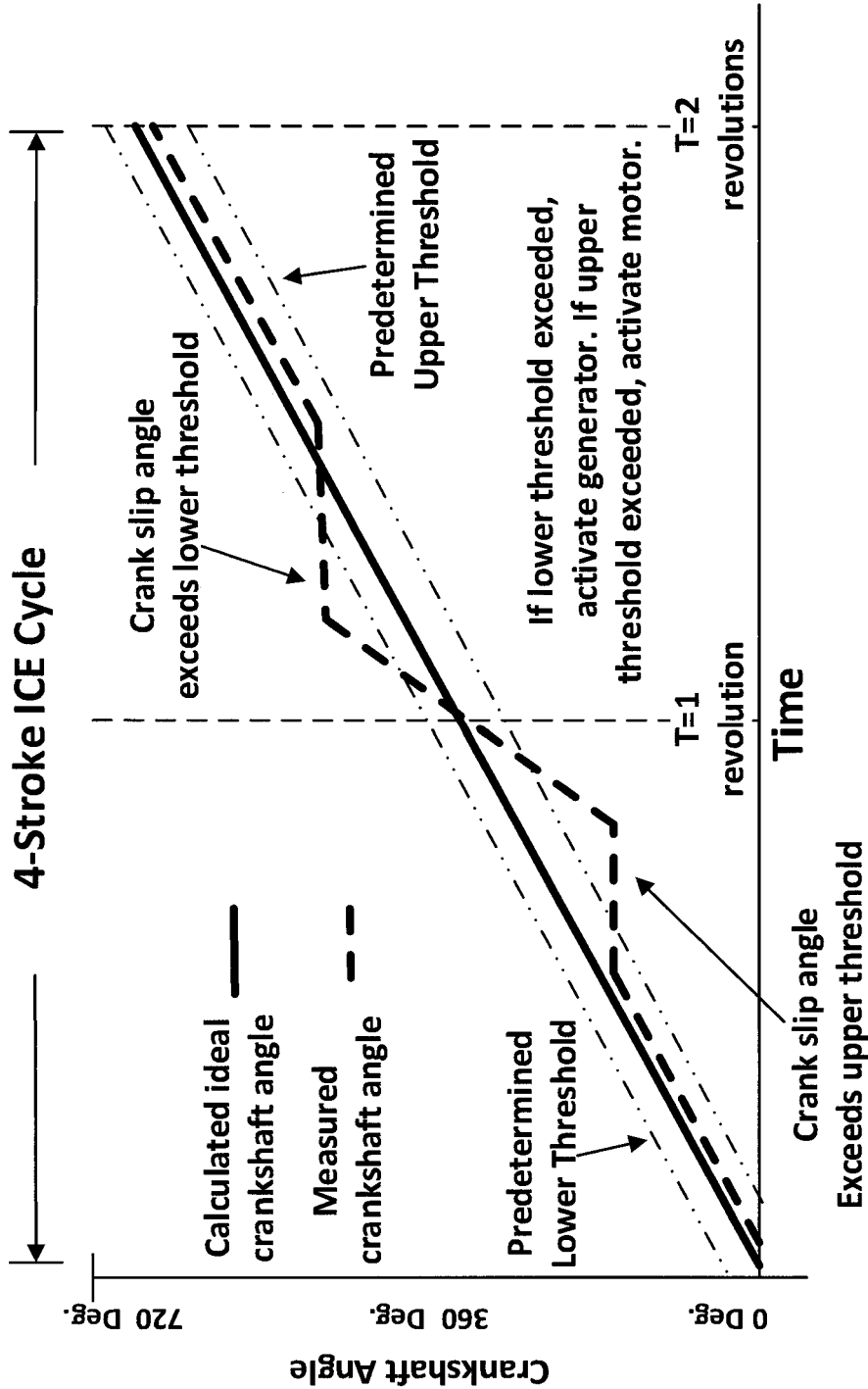
FIG. 4 is a plot of one example of calculated ideal crankshaft angle and measured crankshaft angle as a function of time in accordance with a preferred embodiment of the present invention.

FIG. 4 illustrates an example of the calculated ideal crankshaft angle and the measured crankshaft angle as a function of time. One complete cycle of a single-piston engine is shown, although the inventive concept applies to all engine and reciprocating machine designs. The solid black line is the ideal, or at least desired, increase in crankshaft angle as a function of time. It is nearly straight and represents a uniform shaft revolution rate with little or few vibrations. Overlaid on top is the output of the current crankshaft angle sensor (212*a*) represented by a dashed line. The controller (210) in this example calculates the current crankshaft slip angle (phase lag) as a function of time by subtracting the measured and/or predicted crankshaft angle (dashed line) from the calculated ideal crankshaft angle (solid black line). Thus, the plot shows that the current crankshaft slip angle is positive when the calculated current crankshaft angle lags (and negative when it leads) the calculated ideal crankshaft angle at any particular point in time.

During the parts of the engine cycles where no power is being produced, one might expect to see a slight lag in phase (i.e. a positive slip angle) between the ideal and the actual measured (or predicted) current crankshaft angle. When the Compression part of the engine cycle starts at around 180 degrees, the phase difference becomes even more positive (i.e., the calculated ideal crankshaft angle-calculated current crankshaft angle >0 degrees). The controller (210) uses this phase difference as an input when deciding whether or not to increase power to the motor to reduce the phase difference, for example, by using a threshold value in its programmed logic decision process. Once the Power part of the engine cycle starts, the shaft (214) will advance quickly and (without intervention) the current crankshaft angle will likely move ahead of the ideal crankshaft angle and the phase difference (i.e. slip angle) will become negative. In this case in some embodiments, the controller (210) may switch the energy converter (204) from a motor to a generator and a variable load may be placed on the shaft (214) to cause the difference in phase magnitude to be reduced. In other preferred embodiments, the controller (210) may increase the power input to, or decrease power output from, the energy converter (204), for example, by reducing power to the motor if present or power out from the generator if present. In this way, the preferred embodiments emulate the desired action of the flywheel to keep the engine running with reduced vibrations and phase error.

If the controller (210) receives a signal from a user/driver, sensor, or other input, for example, that maximum power is desired out of the Power Plant (206), then the calculated phase difference may be overridden by the controller (210) to quickly speed up (e.g., 100% motor power added) or slow down (e.g., 100% generator power subtracted) the output of the ICE (202). In many scenarios, the operation of the virtual flywheel will be linear. That is, all components are linear, and the greater the phase difference magnitude (crankshaft slip angle magnitude), the larger the correction to phase the controller's programmed logic will seek in a linear fashion. In some scenarios, the system will not be linear. Some components may be on-off, or provide non-linear input or outputs. Alternatively, the controller's programmed logic will use a mathematical function that is not linear (e.g., logarithmic, fuzzy logic, or artificial intelligence (AI)) when utilizing the phase angle difference to produce the corrective outputs.

Essentially the same inventive concepts can operate with multiple pistons, or with other engine designs such as two-stroke and Wankel engines, or other machines such as those installed on a factory assembly line. The components utilized to implement a preferred embodiment are critical to carefully track the shaft phase and react with sufficient torque to achieve the desired virtual flywheel action.

4. Desirable Attributes and Components

Desirable attributes of the virtual flywheel depend upon the following requirements:

A. Accuracy. The corrections provided to the shaft (214) angle by the controller (210) and energy converter (204) may be acceptable by an open loop feedback architecture (i.e., Position Prediction Operation). The closed loop architecture (i.e., Phase-Locked Operation) may provide better tracking and accuracy to produce the least amount of vibration, or other undesirable actions, in the shaft (214). Additional feedback sensors (212*a*, 212*b*) may be provided to monitor parameters such as noise, vibration, or external inputs like pending changes in output load from a manufacturing device that cycles in need (e.g., every few seconds the output load increases). The feedback may be used to modify the controller's actions in a positive way to reduce detected problems, for example, by changing the phase angle or magnitude of corrections.

B. Sensitivity and Noise Rejection. The system should only be sensitive to the conditions that matter for successful control of the shaft (214). It further should be insensitive to inputs that may be noise, for example, angle digitization error, electrical noise, and power fluctuations.

C. Stability. Control inputs, even if in error, should not cause unstable outputs from the controller (210). Limits may be imposed to prevent runaway conditions. For example, a limit might shut down the ICE if a stability problem exists.

D. Bandwidth. The system should be able to handle a wide range in operating parameters such as engine RPM, load, supply power levels, and temperatures. For example, if the maximum speed of an engine is 9000 RPM, then the engine is running at 150 revolutions/second. The sensors should preferably sample the shaft (214) multiple times per degree, so an angle encoder sensor with a resolution of 4096 (i.e., 12 bits) would provide a resolution of about 0.1 degree. The samples would be output by the sensor 600,000 times per second.

E. Speed and Oscillation Rejection. Ideally, the system should be able to process the sensor inputs and quickly provide corrections to the control elements, yet be able to avoid oscillations caused by the system. In the example provided above, roughly every microsecond the controller (210) will get a new set of sensor inputs and adjust outputs. The mechanical components of the energy converter (204) should be able to respond with enough fidelity to implement the directives of the controller (210).

Depending upon the application, the precise components to be used in a preferred implementation of a preferred embodiment may include:

1. Sensors (212*a*, 212*b*). For the current crankshaft angle sensor, a high angular resolution optical absolute encoder such as those provided by Renishaw ple are preferred.

2. Energy converter (204). The MGU, motors, and generators should have sufficient permanent magnets and stator windings, or other active and passive elements, to provide high torque in generation or motor modes over fractions of the ICE cycle. The armature will be preferably lightweight—e.g., lighter than a lightweight flywheel by 50% or more. The output and/or input of the energy converter is preferably multi-level or continuous and not merely on-off. Preferably, the power rating of the energy converter would match or be a significant percentage of the maximum power output of the ICE. The energy converter should have the fidelity to be able to respond over fractions of a cycle, e.g., by switching from motor to generator modes and back. Preferably, the fidelity would be a fraction of a degree at an idle speed. Some types of integrated servomotor designs scaled up for high speed, torque, and power may work to combine sensors and the energy converter into a single unit.

3. Energy Storage Device (208). The energy storage device should provide and absorb the power loads that the energy converter can produce or require. If the MGU is 200 HP, then the energy storage device needs to handle approximately 300 kilowatts switched on-off (or ramped) up to hundreds of times per second. High output Lithium-ion batteries, capacitors, super capacitors or similar devices, or combinations are preferred.

4. Controller (210). The controller (210) should be able to handle high-speed sensor inputs, calculations, and power system switching. Preferred controllers would use a programmable logic operating in a CPU, GPU, ASIC, or FPGA from a company such as AMD, Intel, or NVIDIA. Ladder logic in ASICs is an example of programmable logic which may be a preferable option in some applications. The controller's programmed logic would preferably interface to a pulse-width-modulation (PWM) high-power control circuit for the energy converter.

II. DETAILED DESCRIPTION OF PREFERRED EMBODIMENT

One preferred embodiment of the present invention provides an apparatus for modifying a crankshaft angle of a crankshaft in an ICE, the ICE including the crankshaft, and a crankshaft angle sensor. The apparatus includes an energy converter, an energy storage unit, and a controller (210). The energy converter is configured to be connected to the crankshaft of the ICE. The energy storage unit is configured to deliver energy to the energy converter when the energy converter acts as a motor, and to store energy output from the energy converter when the energy converter acts as a generator.

Figure 5:
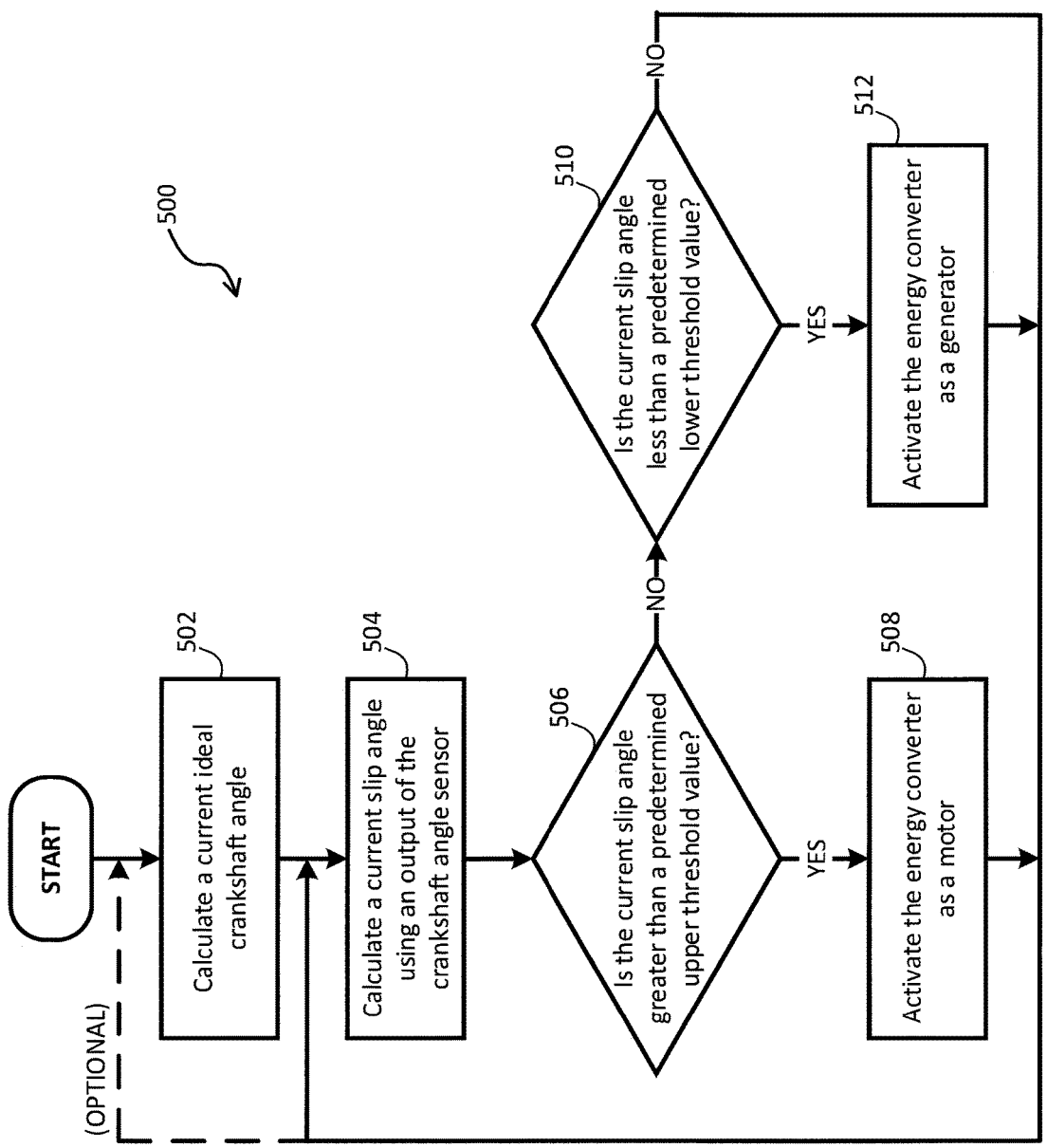
FIGS. 5-7 are flowcharts of controllers for modifying a crankshaft angle of an ICE in accordance with preferred embodiments of the present invention.

FIG. 5 is a flowchart 500 of the controller (210). The controller (210) is configured to perform at least the following functions:
1. Calculate a current ideal crankshaft angle. (Step 502)
2. Calculate a current slip angle using an output of the crankshaft angle sensor. (Step 504)
3. Activate the energy converter as a motor to increase the current crankshaft angle when the current slip angle is greater than a predetermined upper threshold value. (Steps 506, 508)
4. Activate the energy converter as a generator to decrease the current crankshaft angle when the current slip angle is less than a predetermined lower threshold value. (Steps 510, 512)

The controller (210) is further configured to repeat its configured functions at predetermined intervals, as shown by the feedback loops after Steps 508, 512, and the "NO" output of the decision blocks 506, 510. The predetermined intervals may be time intervals or intervals based on the current crankshaft angle. In one embodiment, the calculation step 502 is only performed once and the repeating functions begin with another calculation of the current slip angle (Step 504). In another embodiment, repeating functions include the calculation step 502, as shown in the dashed optional portion of the feedback line.

Another preferred embodiment of the present invention provides apparatus for modifying a crankshaft angle of crankshaft in an ICE wherein the energy converter is a motor. The ICE includes the crankshaft, and a crankshaft angle sensor. The apparatus includes an energy converter (here, a motor), an energy storage unit, and a controller (210). The energy converter is configured to be connected to the crankshaft of the ICE. The energy storage unit is configured to deliver energy to the energy converter when the energy converter acts as a motor.

Figure 6:
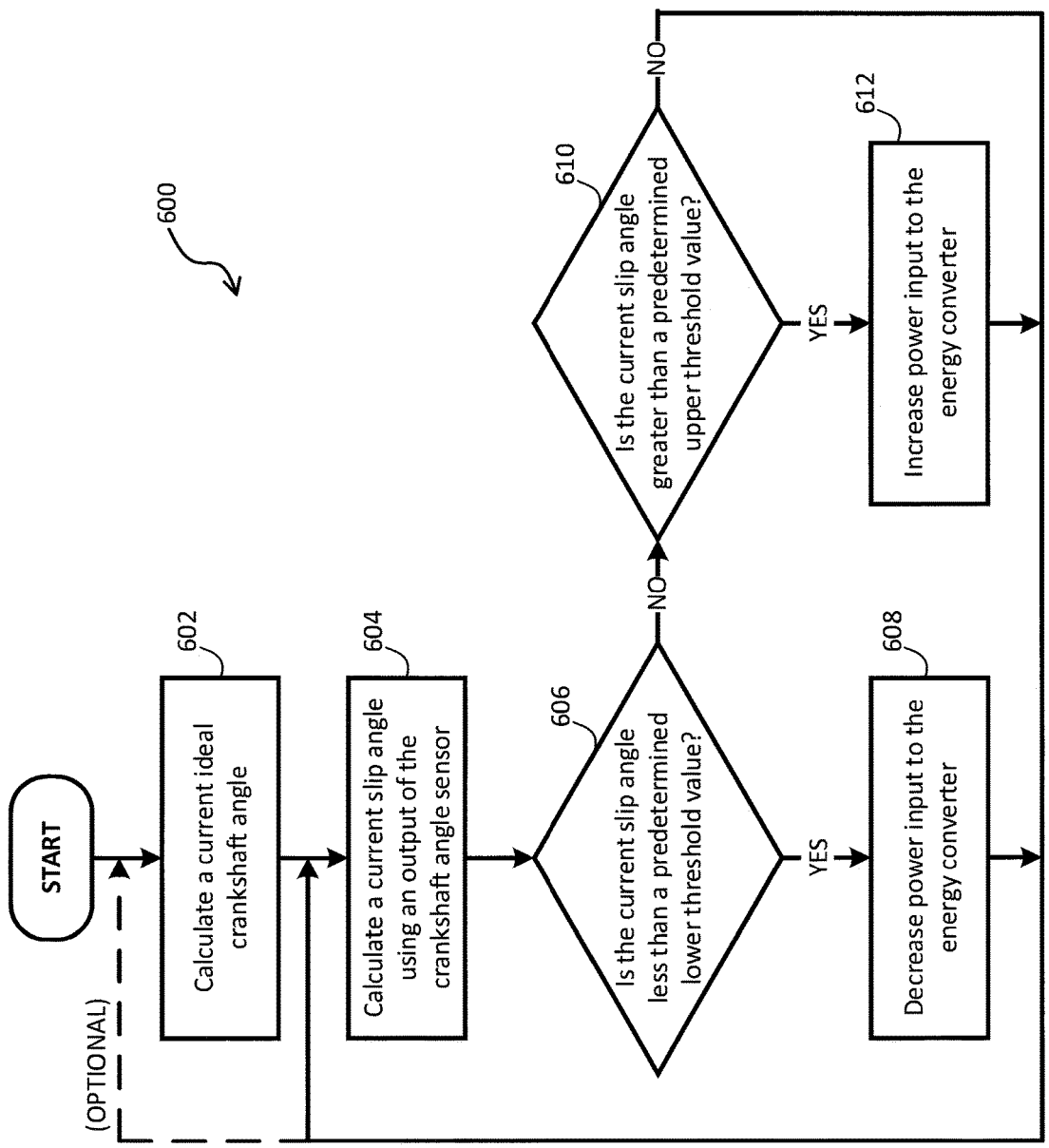

FIG. 6 is a flowchart 600 of the controller (210). The controller (210) is configured to perform at least the following functions:
1. Calculate a current ideal crankshaft angle. (Step 602)
2. Calculate a current slip angle using an output of the crankshaft angle sensor. (Step 604)
3. Decrease power input to the energy converter (motor) to decrease the current crankshaft angle when the current slip angle is less than a predetermined lower threshold value. (Steps 606, 608)
4. Increase power input to the energy converter (motor) to increase the current crankshaft angle when the current slip angle is greater than a predetermined upper threshold value. (Steps 610, 612)

The controller (210) is further configured to repeat its configured functions at predetermined intervals, as shown by the feedback loops after Steps 608, 612, and the "NO" output of the decision blocks 606, 610. The predetermined intervals may be time intervals or intervals based on the current crankshaft angle. In one embodiment, the calculation step 602 is only performed once and the repeating functions begin with another calculation of the current slip angle (Step 604). In another embodiment, repeating functions include the calculation step 602, as shown in the dashed optional portion of the feedback line.

Another preferred embodiment of the present invention provides apparatus for modifying a crankshaft angle of crankshaft in an ICE wherein the energy converter is a generator. The ICE includes the crankshaft, and a crankshaft angle sensor. The apparatus includes an energy converter (here, a motor), an energy storage unit, and a controller (210). The energy converter is configured to be connected to the crankshaft of the ICE. The energy storage unit is configured to store energy output from the energy converter when the energy converter acts as a generator.

Figure 7:
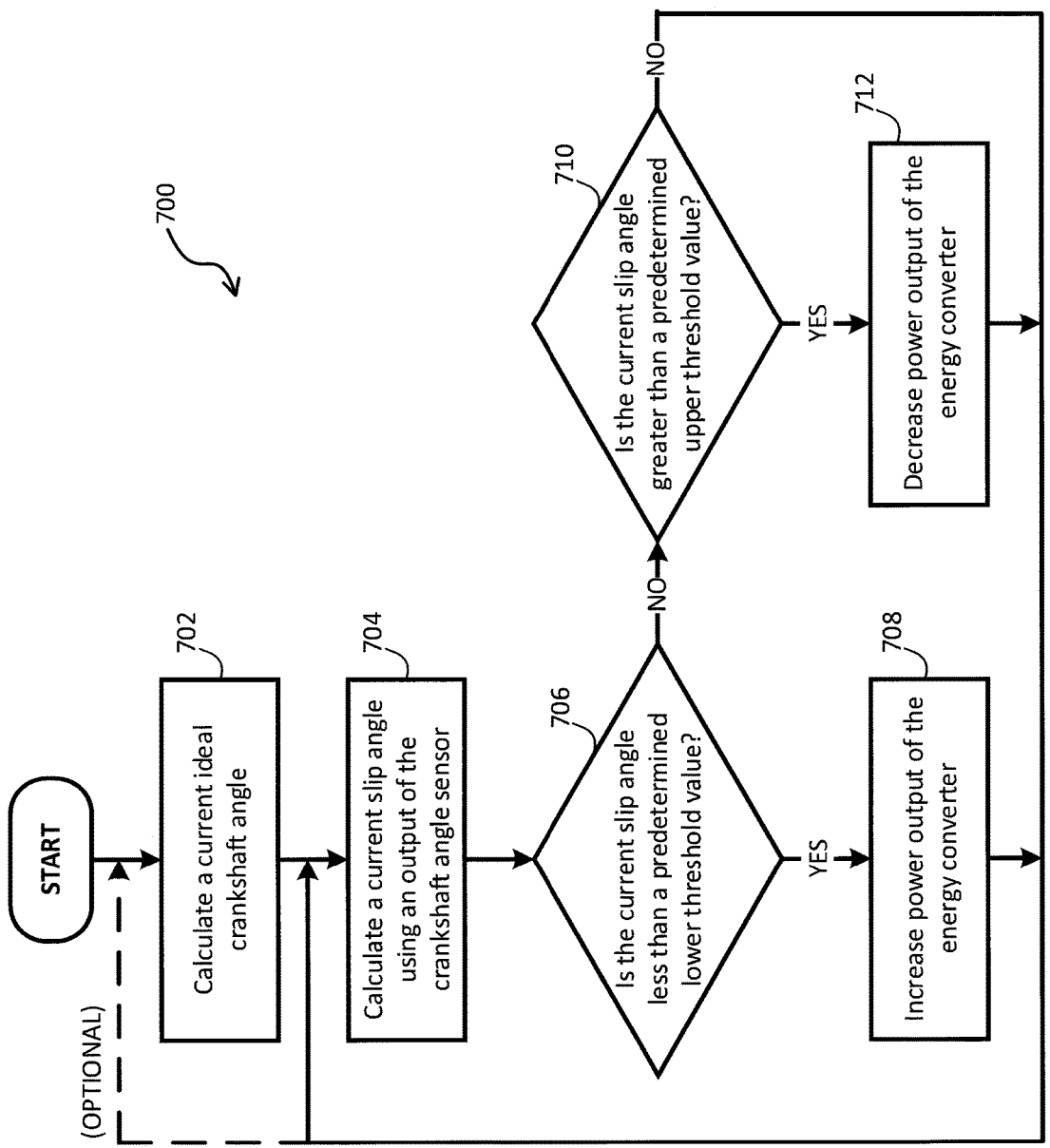

FIG. 7 is a flowchart 700 of the controller (210). The controller (210) is configured to perform at least the following functions:
1. Calculate a current ideal crankshaft angle. (Step 702)
2. Calculate a current slip angle using an output of the crankshaft angle sensor. (Step 704)
3. Increase power output of the energy converter (generator) to decrease the current crankshaft angle when the current slip angle is less than a predetermined lower threshold value. (Steps 706, 708)
4. Decrease power output of the energy converter (generator) to increase the current crankshaft angle when the current slip angle is greater than a predetermined upper threshold value. (Steps 710, 712)

The controller (210) is further configured to repeat its configured functions at predetermined intervals, as shown by the feedback loops after Steps 708, 712, and the "NO" output of the decision blocks 706, 710. The predetermined intervals may be time intervals or intervals based on the current crankshaft angle. In one embodiment, the calculation step 702 is only performed once and the repeating functions begin with another calculation of the current slip angle (Step 704). In another embodiment, repeating functions include the calculation step 702, as shown in the dashed optional portion of the feedback line.

Another preferred embodiment provides a computer program product configured to modify a crankshaft angle of a crankshaft in an ICE of a vehicle. The ICE includes the crankshaft, and a crankshaft angle sensor. The vehicle includes an energy converter configured to be connected to the crankshaft of the ICE, and an energy storage unit configured to deliver energy to the energy converter when the energy converter acts as a motor, and to store energy output from the energy converter when the energy converter acts as a generator. The computer program product comprises a non-transitory computer readable medium tangibly embodying computer-executable program instructions thereon that, when executed, cause one or more computing devices (one of which may be a controller (210)) to perform at least the following functions, which are the same functions as shown in the embodiment of FIG. 5:
1. Calculate a current ideal crankshaft angle. (Step 502)
2. Calculate a current slip angle using an output of the crankshaft angle sensor. (Step 504)
3. Activate the energy converter as a motor to increase the current crankshaft angle when the current slip angle is greater than a predetermined upper threshold value. (Steps 506, 508)
4. Activate the energy converter as a generator to decrease the current crankshaft angle when the current slip angle is less than a predetermined lower threshold value. (Steps 510, 512)

The controller (210) is further configured to repeat its configured functions at predetermined intervals, as shown by the feedback loops after Steps 508, 512, and the "NO" output of the decision blocks 506, 510. The predetermined intervals may be time intervals or intervals based on the current crankshaft angle. In one embodiment, the calculation step 502 is only performed once and the repeating functions begin with another calculation of the current slip angle (Step 504). In another embodiment, repeating functions include the calculation step 502, as shown in the dashed optional portion of the feedback line.

Another preferred embodiment of the present invention provides a computer program product for modifying a crankshaft angle of a crankshaft in an ICE wherein the energy converter is a motor. The ICE includes the crankshaft, and a crankshaft angle sensor. The vehicle includes an energy converter (here, a motor) configured to be connected to the crankshaft of the ICE, and an energy storage unit configured to deliver energy to the energy converter when the energy converter acts as a motor. The computer program product comprises a non-transitory computer readable medium tangibly embodying computer-executable program instructions thereon that, when executed, cause one or more computing devices (one of which may be a controller (210)) to perform at least the following functions, which are the same functions as shown in the embodiment of FIG. 6:
1. Calculate a current ideal crankshaft angle. (Step 602)
2. Calculate a current slip angle using an output of the crankshaft angle sensor. (Step 604)
3. Decrease power input to the energy converter (motor) to decrease the current crankshaft angle when the current slip angle is less than a predetermined lower threshold value. (Steps 606, 608)
4. Increase power input to the energy converter (motor) to increase the current crankshaft angle when the current slip angle is greater than a predetermined upper threshold value. (Steps 610, 612)

The controller (210) is further configured to repeat its configured functions at predetermined intervals, as shown by the feedback loops after Steps 608, 612, and the "NO" output of the decision blocks 606, 610. The predetermined intervals may be time intervals or intervals based on the current crankshaft angle. In one embodiment, the calculation step 602 is only performed once and the repeating functions begin with another calculation of the current slip angle (Step 604). In another embodiment, repeating functions include the calculation step 602, as shown in the dashed optional portion of the feedback line.

Another preferred embodiment of the present invention provides a computer program product for modifying a crankshaft angle of a crankshaft in an ICE wherein the energy converter is a generator. The ICE includes the crankshaft, and a crankshaft angle sensor. The vehicle includes an energy converter (here, a generator) configured to be connected to the crankshaft of the ICE, and an energy storage unit configured to store energy output from the energy converter when the energy converter acts as a generator. The computer program product comprises a non-transitory computer readable medium tangibly embodying computer-executable program instructions thereon that, when executed, cause one or more computing devices (one of which may be a controller (210)) to perform at least the following functions, which are the same functions as shown in the embodiment of FIG. 7:
1. Calculate a current ideal crankshaft angle. (Step 702)
2. Calculate a current slip angle using an output of the crankshaft angle sensor. (Step 704)
3. Increase power output of the energy converter (generator) to decrease the current crankshaft angle when the current slip angle is less than a predetermined lower threshold value. (Steps 706, 708)
4. Decrease power output of the energy converter (generator) to increase the current crankshaft angle when the current slip angle is greater than a predetermined upper threshold value. (Steps 710, 712)

The controller (210) is further configured to repeat its configured functions at predetermined intervals, as shown by the feedback loops after Steps 708, 712, and the "NO" output of the decision blocks 706, 710. The predetermined intervals may be time intervals or intervals based on the current crankshaft angle. In one embodiment, the calculation step 702 is only performed once and the repeating functions begin with another calculation of the current slip angle (Step 704). In another embodiment, repeating functions include the calculation step 702, as shown in the dashed optional portion of the feedback line.

In each of the six embodiments described above, the controller (210) may be configured to calculate the current slip angle by using the current ideal crankshaft angle and a current crankshaft angle from the crankshaft angle sensor. This is an embodiment wherein the controller (210) operates as a phase-locked, closed-loop control system, as described above in the section regarding operation of the controller (210) in Phase-Locked Operation.

In each of the embodiments described above, the controller (210) may alternatively be configured to calculate the current slip angle using sensor values and programmed logic. This is an embodiment wherein the controller (210) operates as an open-loop controller (210), as described above in the section regarding operation of the controller (210) in Controller Position Prediction Operation.

Programmed logic, as used herein, refers to the fundamental approach used in all computer programs and is a process of breaking down a problem into a series of clear, step-by-step instructions that a computer can follow. This involves using logical operators (e.g., IF/THEN statements) and control flow structures (e.g., loops) to make decisions and repeat actions based on conditions. The programmed logic provides the roadmap used by a programmer to create software to achieve the desired outcome.

In each of the embodiments described above, the energy converter may be a motor generator unit (MGU) and the energy storage unit may be a supercapacitor.

In each of the embodiments above, the apparatus may further include a vibration sensor and the controller (210) is further configured to disable the energy converter when an output of the vibration sensor is below a predetermined threshold value.

In each of the embodiments above, the energy converter may be configured to be connected to the crankshaft of the ICE by a transmission.

III. ADDITIONAL CONSIDERATIONS

1. Crankshaft Sensors

In one embodiment, a single crankshaft sensor is used to calculate the current slip angle. In another embodiment, at least two crankshaft sensors are used, one at each end of the crankshaft to measure torsion, and as a result, provide data necessary for the calculations accomplished in the controller (210), for example, by averaging the sensor outputs to provide a more reliable sensor output value. Alternatively, the multiple sensor outputs may be utilized to track variations of the torsion and vibration over time and in relation to crankshaft angle . . .

2. Software Aspects

In one preferred embodiment, the controller (210) described above is implemented as a software program. Thus, the controller (210) of the present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for modifying a crankshaft angle of an ICE, wherein the computer program product comprises non-transitory computer-readable media encoded with instructions for execution by a processor (or computing device) to perform the methods described above. More specifically, the controller (210) described above may be implemented using one or more of such processors or computer systems.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An apparatus for modifying a crankshaft angle of a crankshaft in an internal combustion engine (ICE), the ICE including (i) the crankshaft, and (ii) a crankshaft angle sensor, the apparatus comprising:
   (a) an energy converter configured to be connected to the crankshaft of the ICE;
   (b) an energy storage unit configured to deliver energy to the energy converter when the energy converter acts as a motor, and to store energy output from the energy converter when the energy converter acts as a generator; and
   (c) a controller configured to:
      (i) calculate a current ideal crankshaft angle, wherein the current ideal crankshaft angle changes with respect to time,
      (ii) calculate a current slip angle using an output of the crankshaft angle sensor,
      (iii) activate the energy converter as a motor to increase the current crankshaft angle when the current slip angle is greater than a predetermined upper threshold value, and
      (iv) activate the energy converter as a generator to decrease the current crankshaft angle when the current slip angle is less than a predetermined lower threshold value.

2. The apparatus of claim 1 wherein the controller is further configured to repeat the configured functions at predetermined intervals.

3. The apparatus of claim 2 wherein the predetermined intervals are time intervals.

4. The apparatus of claim 2 wherein the predetermined intervals are intervals based on the current crankshaft angle.

5. The apparatus of claim 1 wherein the controller is configured to calculate the current slip angle by using the current ideal crankshaft angle and a current crankshaft angle from the crankshaft angle sensor.

6. The apparatus of claim 1 wherein the controller is configured to calculate the current slip angle by predicting the current slip angle using (i) sensor values, and (ii) programmed logic.

7. The apparatus of claim 1 wherein the energy converter is a motor generator unit (MGU).

8. The apparatus of claim 1 wherein the energy storage unit is a supercapacitor.

9. The apparatus of claim 1 further comprising:
   (d) a vibration sensor,
      the controller being further configured to:
      (v) disable the energy converter when an output of the vibration sensor is below a predetermined threshold value.

10. The apparatus of claim 1 wherein the energy converter is configured to be connected to the crankshaft of the ICE by a transmission.

11. An apparatus for modifying a crankshaft angle of a crankshaft in an internal combustion engine (ICE), the ICE including (i) the crankshaft, and (ii) a crankshaft angle sensor, the apparatus comprising:
   (a) an energy converter configured to be connected to the crankshaft of the ICE;
   (b) an energy storage unit configured to deliver energy to the energy converter when the energy converter acts as a motor; and
   (c) a controller configured to:
      (i) calculate a current ideal crankshaft angle, wherein the current ideal crankshaft angle changes with respect to time,
      (ii) calculate a current slip angle using an output of the crankshaft angle sensor, and
      (iii) decrease power input to the energy converter to decrease the current crankshaft angle when the current slip angle is less than a predetermined lower threshold value,
   wherein the energy converter is a motor.

12. The apparatus of claim 11 wherein the controller is further configured to repeat the configured functions at predetermined intervals.

13. The apparatus of claim 12 wherein the predetermined intervals are time intervals.

14. The apparatus of claim 12 wherein the predetermined intervals are intervals based on the current crankshaft angle.

15. The apparatus of claim 11 wherein the controller is further configured to:
   (iv) increase power input to the energy converter to increase the current crankshaft angle when the current slip angle is greater than a predetermined upper threshold value.

16. The apparatus of claim 11 wherein the controller is configured to calculate the current slip angle by using the current ideal crankshaft angle and a current crankshaft angle from the crankshaft angle sensor.

17. The apparatus of claim 11 wherein the controller is configured to calculate the current slip angle by predicting the current slip angle using (i) sensor values, and (ii) programmed logic.

18. The apparatus of claim 11 further comprising:
   (d) a vibration sensor,
      the controller being further configured to:
      (iv) disable the energy converter when an output of the vibration sensor is below a predetermined threshold value.

19. The apparatus of claim 11 wherein the energy converter is configured to be connected to the crankshaft of the ICE by a transmission.

20. An apparatus for modifying a crankshaft angle of a crankshaft in an internal combustion engine (ICE), the ICE including (i) the crankshaft, and (ii) a crankshaft angle sensor, the apparatus comprising:
   (a) an energy converter configured to be connected to the crankshaft of the ICE;
   (b) an energy storage unit configured to store energy output from the energy converter when the energy converter acts as a generator; and
   (c) a controller configured to:
      (i) calculate a current ideal crankshaft angle, wherein the current ideal crankshaft angle changes with respect to time,
      (ii) calculate a current slip angle using an output of the crankshaft angle sensor, and
      (iii) increase power output of the energy converter to decrease the current crankshaft angle when the current slip angle is less than a predetermined lower threshold value,
   wherein the energy converter is a generator.

21. The apparatus of claim 20 wherein the controller is further configured to repeat the configured functions at predetermined intervals.

22. The apparatus of claim 21 wherein the predetermined intervals are time intervals.

23. The apparatus of claim 21 wherein the predetermined intervals are intervals based on the current crankshaft angle.

24. The apparatus of claim 20 wherein the controller is further configured to:
   (v) decrease power output of the energy converter to increase the current crankshaft angle when the current slip angle is greater than a predetermined upper threshold value.

25. The apparatus of claim 20 wherein the controller is configured to calculate the current slip angle by using the current ideal crankshaft angle and a current crankshaft angle from the crankshaft angle sensor.

26. The apparatus of claim 20 wherein the controller is configured to calculate the current slip angle by predicting the current slip angle using (i) sensor values, and (ii) programmed logic.

27. The apparatus of claim 20 further comprising:
   (d) a vibration sensor,
      the controller being further configured to:
      (iv) disable the energy converter when an output of the vibration sensor is below a predetermined threshold value.

28. The apparatus of claim 20 wherein the energy converter is configured to be connected to the crankshaft of the ICE by a transmission.

\* \* \* \* \*